Feb. 5, 1946.   N. A. CHRISTENSEN   2,394,364
PRESSURE SEAL
Filed April 15, 1943
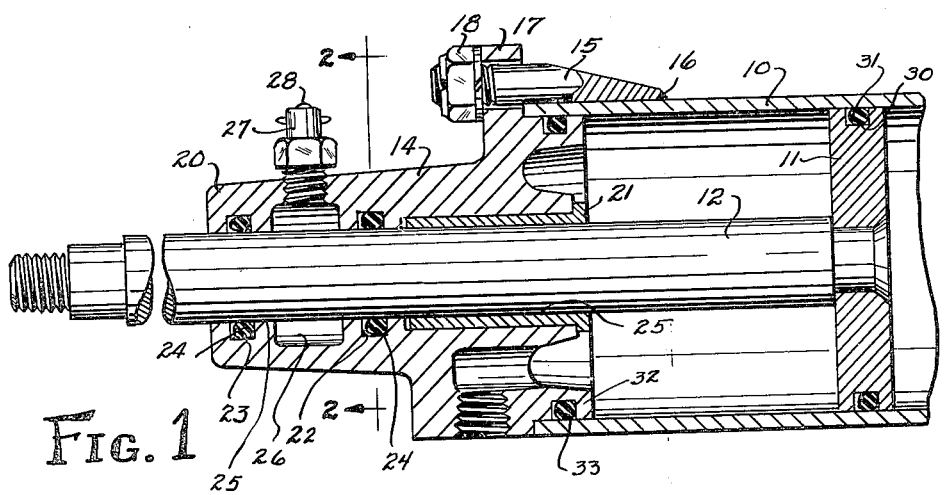
Fig. 1
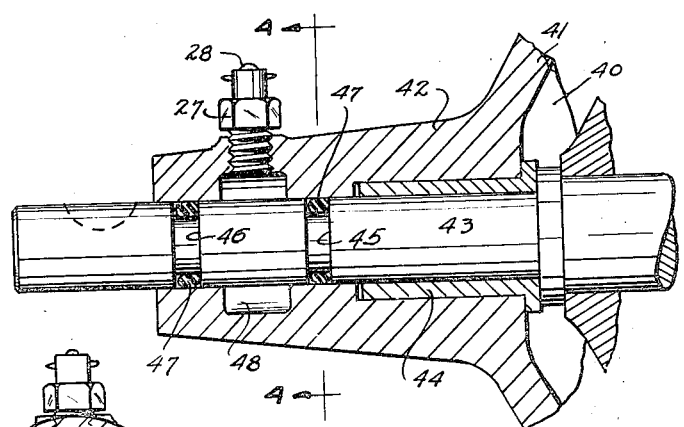
Fig. 3
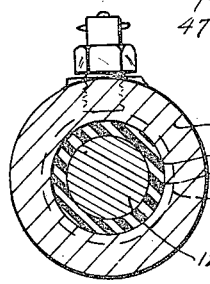
Fig. 2
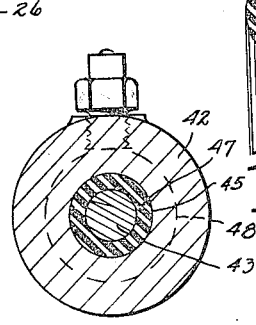
Fig. 4
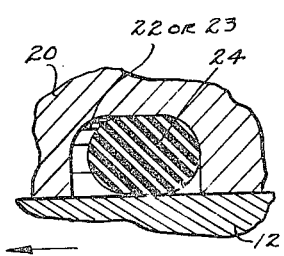
Fig. 5
Fig. 6
INVENTOR.
NIELS A. CHRISTENSEN
BY Bates, Teare & McBean
ATTORNEYS Patented Feb. 5, 1946

2,394,364

UNITED STATES PATENT OFFICE 2,394,364

PRESSURE SEAL

Niels A. Christensen, South Euclid, Ohio

Application April 15, 1943, Serial No. 483,165

3 Claims. (Cl. 286—26)

This invention relates to an improvement in packing devices and particularly to an improved pressure seal to prevent the escape of fluid under pressure between the coacting surfaces of two relatively movable members. This, therefore, is the general object of the present invention. An important feature of this invention is the provision of a pressure seal having one packing unit adjacent the pressure source to prevent the escape of fluid between two coacting and relatively movable surfaces, and the provision of a second packing unit which is spaced from the first unit. The second unit is normally inactive but it is ready at all times to take over the burden of maintaining the fluid pressure head should the first unit fail.

Therefore, an object of this invention is to provide means to insure lubrication of the second packing unit so as to increase its life and ability to take over the duties of the first unit should the latter fail.

Other objects and features of the present invention will become more apparent from the following description, reference being had to the accompanying drawing which illustrates embodiments of the invention. The essential and novel features of the invention will be summarized in the claims.

In the drawing, Fig. 1 is an axial section showing cylinders, such as pump cylinders having my improved sealing device incorporated therein; Fig. 2 is a transverse section generally indicated by the lines 2—2 on Fig. 1; Fig. 3 is a view similar to Fig. 1, but illustrating a modification of the sealing device, together with its use in connection with relatively rotating members; Fig. 4 is a transverse section indicated by the line 4—4 in Fig. 3; Fig. 5 is a fragmentary sectional view on a greatly enlarged scale of a packing ring used in connection with my improved device; and Fig. 6 is a sectional view on an enlarged scale diagrammatically illustrating the packing ring of Fig. 5 in position in the sealing device.

Referring now to the drawing, I have illustrated in Fig. 1 a cylinder and piston unit generally comprising a cylinder 10 within which a piston 11 is reciprocably mounted. A piston rod 12 reciprocates through a cap 14 which is secured in place at the end of the cylinder by bolts or studs 15 and nuts 18. As shown, the studs are secured to the cylinder wall 10, as by welds 16, and pass through suitable openings in the flange 17 of the cap 14. As shown, the cap is provided with an elongated boss-like formation 20 at the internal end of which is positioned a bearing sleeve 21 which is secured to the cap in any suitable manner. Between the end of the bearing sleeve and the end of the cap I provide two annular grooves 22 and 23. Mounted in each groove is a packing ring 24. These packing rings are preferably made of solid rubber of a synthetic composition which is very dense and yet possessive of great liveliness and elasticity. Each ring is normally circular and, prior to assembly, is of a cross section such as that indicated in Fig. 5. The inner periphery of the ring is slightly less than the circumference of the piston rod 12 so that when the shaft is slid into the axial bore 25 of the cap, the ring will be compressed into a substantially ellipsoidal section, as diagrammatically illustrated in Fig. 6.

Each annular recess 22 and 23 is wider than the major axis of the compressed ring, as a result of which when the shaft 12 moves to the left (Fig. 6) the packing will roll along the shaft until it occupies the left hand portion of the groove, and will return to the position shown in Fig. 6, consequent upon a movement of the shaft in the reverse direction. This movement of the packing is important because it kneads or works the material of the ring thus keeping it alive and pliable and eliminating scuffing which would otherwise be caused by the static sliding of the totally confined rubber along the surface. I have found that this type of packing ring is highly advantageous to retain pressure heads in a cylinder and that it substantially eliminates seepage therefrom.

I have found, however, that where a high factor of safety is desired, such as in aircraft work, it is highly desirable to provide a second packing ring at a distance spaced from the first. The second ring, under normal conditions, is not required to prevent the escape of fluid pressure along the piston rod 12, but it acts upon failure of the packing ring 22 to maintain the fluid pressure as before. This is especially advantageous in uses where the fluid in the cylinder is apt to deteriorate the ring. In such construction I find when the inner ring 22 completely stops the escape of fluid between the piston rod and the bearing sleeve or cap 20 that the outer ring 24 becomes dry and has a tendency to wear out sooner than the inner ring which is subjected to the pressure load.

To eliminate premature deterioration of the outer packing ring, I provide an enlarged annular recess 26 in the housing intermediate the recesses 22 and 23. This recess 26, as seen from Fig. 1 is materially larger than the ring receiving recesses and is provided with a threaded inlet opening into which a pressure fitting 27 is secured to admit a lubricant under pressure to the interior of the chamber 26 thus insuring lubrication of the shaft and the sealing ring 24.

The annular recess 26 also serves another important function. When the packing device is used to seal certain types of fluid, a microscopic film of the fluid adheres to the shaft and escapes past the inner packing ring but is held by the outer ring, and after a prolonged period of time, has the tendency to build up an excess pressure between the two packing rings, which under certain climatic conditions becomes dangerous. The enlarged recess 26 serves as an auxiliary chamber to relieve this pressure and prevent its building up to a dangerous point. This can be assured, either by utilizing a grease fitting of a pressure relief type, or merely by the size of the chamber 26, relying upon an attendant to depress the spring-pressed closing ball 28 of the fitting 27 at stated intervals to release the pressure.

Referring again to Fig. 6, it will be noted that as the piston rod 12 moves in the direction of the arrow, the packing will move into the unoccupied portion of the slot, there being a rolling contact between the coacting surfaces of the packing ring and the shaft 12. The lubricant in the unoccupied portion of the annular slot 22 flows out and causes the coacting surfaces between the ring and both the shaft and the wells of the recess 22 and 23 to be thoroughly lubricated under pressure. As the shaft returns in the direction opposite that of the arrow the ring tends to roll to the position shown in Fig. 6, whereupon the lubricant under pressure in the chamber 26 flows between the coacting surfaces of the shaft and bearing into the unoccupied portion of the recess 22. Thus it will be seen that both sides of the ring 24 are under pressure, one being a normal pressure of the fluid contents of the cylinder and the other the pressure from that of the recess 26, so that regardless of the direction of movement of the shaft, the unoccupied portion of the ring-receiving recess will be filled with lubricant which will be forced from the recess thereby insuring lubrication of the coacting surfaces, and materially prolonging the life of the packing.

As indicated in Fig. 1, I prefer to use the same type of packing heretofore described in the piston itself. In this case the piston is provided with a groove 30 to receive a ring 31 in the same manner heretofore described in connection with the packing ring 24. I also find it advantageous to employ a similar packing ring in securing the cap 14 to the cylinder 10. To this end, the cap has a reduced section 32 arranged to project into the cylinder and has formed an annular recess 33 in the periphery of this portion, to receive a packing ring which is similar to rings 24 and 31 heretofore described. I find that this eliminates the need for a gasket between the end cover and the walls of the cylinder and permits the use of materially lighter weight studs 15 than would be required when a gasket is utilized between the cylinder and its head. The invention eliminates the pre-strain due to wrench tightening of the conventional gasket, as a result of which the studs are subjected to only the unit stress of the piston area. The studs or longer side rods can expand or contract without causing leakage adjacent the seal. Additionally, considerable range of relative motion due to expansion and contraction of the component parts is permitted as a result of the improved seal structure, wherefore the nuts may be tightened only to a touch contact after the end cover has been inserted in the cylinder and then may be wired to prevent them from working loose.

The foregoing description applicable to Fig. 1, is illustrated in connection with seals for reciprocating parts. Such elements, however, are also applicable to seals for rotary or semi-rotary shafts, but in such case, it is desirable to have a shoulder on the shaft engaging the end of the bearing sleeve 44 as is shown in Fig. 3. In such instance, the ring and groove structure in the housing would be the same for a rotary shaft as for a reciprocating shaft.

In Figs. 3 and 4, I illustrate the use of my improved packing device in connection with a rotary shaft, such for example as on a pump 40 in which a fluid pressure head is maintained. In this instance, the pump housing 41 is provided with a boss-like formation 42 having an axial opening for receiving the pump rotary shaft 43. A suitable bearing member 44 is positioned in the opening and held in any suitable manner to provide a journal for the shaft. As shown in this modification, the shaft is provided with a pair of annular recesses 45 and 46 to receive packing rings 47 similar in all respects to rings 24 heretofore described. The boss 42 of the pump housing is provided with an annular recess 48 intermediate the region of the two bearing rings 47. This recess is provided with a threaded opening 27 for the reception of a pressure lubricant fitting 28 as heretofore described in connection with Fig. 1. The action of the packing is substantially the same as when used in connection with the piston, because rotary shafts have a slight reciprocating movement which while small in comparison with that of a reciprocating piston rod, nevertheless is sufficient under normal conditions to provide lubrication of the packing rings as heretofore described.

I claim:

1. A seal between two relatively rotating elements, one comprising a casing member and the other comprising a rotating shaft member, one of said members having a pair of annular grooves therein, and the casing member having an annular recess for receiving pressure fluid, a packing ring in each groove, each of said packing rings having rubber-like characteristics and being normally circular in cross section and of a diameter greater than the depth of the associated packing ring groove, whereby the rings when in position will be deformed to substantially an elliptical cross section to provide sealing surfaces between the shaft and casing, and each groove having a width greater than the largest cross sectional dimension of the associated packing ring in the deformed position thereof, whereby each ring may move slightly within its associated groove in a direction extending axially of the rotating member during use.

2. A seal between two relatively rotating elements, one comprising a casing member having a hub portion thereon, and the other comprising a rotating shaft member projecting into the hub, the hub having a pair of spaced annular grooves therein and having an annular recess between said grooves for receiving pressure fluid, a packing ring in each groove, each of said packing rings having rubber-like characteristics and being normally circular in cross section and of a diameter greater than the depth of the associated packing ring groove, whereby the rings when in position will be deformed to a substantially elliptical cross section to provide sealing surfaces between the shaft and casing, and each groove having a width greater than the largest cross sectional dimension of the associated packing ring in the deformed position thereof, whereby each ring may move slightly within its associated groove in a direction extending axially of the rotating member during use.

3. A seal between two relatively rotating elements, one comprising a casing having a hub and the other comprising a rotating shaft which extends into the hub, said shaft having a pair of spaced annular grooves therein and the hub having an annular recess disposed between said grooves for receiving pressure fluid, a packing ring in each groove, each of said packing rings having rubber-like characteristics and being normally circular in cross section and of a diameter greater than the depth of the associated packing ring groove, whereby the rings when in position will be deformed to a substantially elliptical cross section to provide sealing surfaces between the shaft and casing, and each groove having a width larger than the largest cross sectional dimension of the associated packing ring in the deformed position thereof, whereby each ring may move slightly within its associated groove in a direction extending axially of the rotating member during use.

NIELS A. CHRISTENSEN.